(12) United States Patent
Wang

(10) Patent No.: US 10,379,918 B2
(45) Date of Patent: Aug. 13, 2019

(54) SYSTEM AND METHOD FOR MPI IMPLEMENTATION IN AN EMBEDDED OPERATING SYSTEM

(71) Applicant: KYLAND TECHNOLOGY CO., LTD, Shijingshan District, Beijing (CN)

(72) Inventor: Yanhong Wang, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/859,497

(22) Filed: Dec. 30, 2017

(65) Prior Publication Data

US 2019/0108077 A1    Apr. 11, 2019

(30) Foreign Application Priority Data

Oct. 9, 2017    (CN) .......................... 2017 1 0930198

(51) Int. Cl.
   *G06F 9/54*    (2006.01)
   *G06F 9/48*    (2006.01)

(52) U.S. Cl.
   CPC ............ *G06F 9/546* (2013.01); *G06F 9/4843* (2013.01); *G06F 9/544* (2013.01); *G06F 9/547* (2013.01)

(58) Field of Classification Search
   None
   See application file for complete search history.

(56) References Cited

U.S. PATENT DOCUMENTS

2008/0092146 A1* 4/2008 Chow
2015/0288777 A1* 3/2015 Yalozo

OTHER PUBLICATIONS

Pin Ping Lai et al, "Designing truly one-sided MPI-2 RMA intra-node communication on multi-core systems", Computer Science—Research and Development; Computer Science—Research and Development Organ der Fachbereiche Softwaretechnik, Datenbanken Und Informationssysteme der Gesellschaft F PRG A[I/4]R Informatik E.V. (GI), Springer-Verlag, Berlin/Heidelb, vol. 25, No. 1-2, Apr. 10, 2010 (Apr. 10, 2010), pp. 3-14.

Richard Neill et al, "Embedded Processor Virtualization for Broadband Grid Computing", 2011 IEEE/ACM 12th International Conference on Grid Computing, Sep. 1, 2011 (Sep. 1, 2011), pp. 145-156.

* cited by examiner

*Primary Examiner* — Syed A Roni
(74) *Attorney, Agent, or Firm* — Arent Fox LLP; Michael Fainberg

(57) ABSTRACT

The disclosure discloses a system and method for Message Passing Interface (MPI) implementation in an embedded operating system, applicable to a communication system including an application layer, an MPI layer, and an operating system layer, where an MPI application at the application layer is an application allocated to one or more MPI nodes; the Mil layer includes a process handling module, an underlying function library, and an MPI Application Programming Interface (API) to be invoked by the MPI application; and the process handling module receives a command of a user to invoke the MPI application, starts the application in response to the command, and invokes a service function of the embedded real-time operating system at the operating system layer through the underlying function library to control the one or more MPI node to execute and finish sub-tasks corresponding to the MPI application on the respective nodes.

14 Claims, 3 Drawing Sheets

SYSTEM AND METHOD FOR MPI IMPLEMENTATION IN AN EMBEDDED OPERATING SYSTEM

CROSS REFERENCE TO RELATED APPLICATION

This application claims priority to Chinese Patent Application No. 201710930198.7, filed with the Chinese Patent Office on Oct. 9, 2017. The entire disclosure of the above application is incorporated herein by reference.

FIELD

The present disclosure relates to the field of communications, and particularly to a system and method for Message Passing Interface (MPI) implementation in an embedded operating system.

BACKGROUND

Underlying researches on the MPI are of great significance to the field of embedded computer communications, but there are few ongoing researches on a particular application of the MPI. Generally for particular computing in the current computer communications, e.g., in large-scale applications involving complex computing, a processing device with higher performance, in multi-thread parallel processing method, and/or by an optimized algorithm or an advanced algorithm is used.

There is some drawback or disadvantage of the respective solutions in the prior art particularly in that: the processor is upgraded at such a speed that can not catch up on the change of demand in our real society, and moreover the upgrade of the processor may be limited due to a manufacturing process, power consumption, a structural design, etc., thereof, thus resulting in a limited improvement in performance thereof; multi-thread programming makes it possible to make full use of the hardware processing capacity in the prior art to thereby shorten a period of time for computing, but a larger number of threads on a single processor may not come with a larger improvement in performance thereof due to a limited real number of physical cores in the processor, so the overall computing performance will be optimized only if the number of threads is in conformity with the real number of cores; and some of the algorithms can not be optimized, or can be optimized but without significant improvement, and it may take a long period of time to research into an advanced algorithm and the resulting advanced algorithm may not agree with a real application.

Apparently there are the following technical problems in the prior art: more powerful hardware of the processor is required for a large application which is be operated, and if the number of tasks corresponding to the application is more than the real number of physical cores in the processor, then the tasks will be processed in a time-division mode, so that it may take a long period of time to operate the application.

SUMMARY

In order address the technical problems above in the prior art, embodiments of the disclosure provide a system and method for MPI implementation in an embedded operating system so as to divide a large-scale computing process involving complex computing into a plurality of segments according to a preset algorithm, to distribute one or more of the segments to a plurality of MPI operating nodes (each node may be a standalone computer) via the MPI for separate computing, and to present their computing results collectively via the MPI. The distribution of the segments, and the collection of the computing results can be performed automatically on the MPI without any human intervention. As compared with the prior art, the system and method for MPI implementation in an embedded operating system can lower a hardware requirement on processors of the computers, support multi-thread parallel processing, and improve the operating speed and the extensibility of the application.

In a first aspect, an embodiment of the disclosure provides a system for MPI implementation in an embedded operating system, applicable to a communication system including:
an application layer, an MPI layer, and an operating system layer;
wherein an MPI application at the application layer is an application allocated to one or more MPI nodes; and the MPI layer includes a process handling module, an underlying function library, and an MPI API interface to be invoked by the MPI application;
the process handling module is configured to receive a command of a user to invoke the MPI application, to start the application in response to the command, and to invoke a service function of the embedded real-time operating system at the operating system layer through the underlying function library to control the one or more MPI node to execute and finish sub-tasks corresponding to the MPI application on the respective nodes.

In a second aspect, an embodiment of the disclosure provides a method for MPI implementation in an embedded operating system, applicable to a communication system including an application layer, an MPI layer, and an operating system layer, wherein an MPI application at the application layer is an application allocated to one or more MPI nodes; the MPI layer includes a process handling module, an underlying function library, and an MPI API interface to be invoked by the MPI application; and the method includes:
receiving, by the process handling module, a command of a user to invoke the MPI application;
starting, by the process handling module, the application in response to the command, and invoking a service function of an embedded real-time operating system at the operating system layer through the underlying function library to control the one or more MPI node to execute and finish sub-tasks corresponding to the MPI application on the respective nodes.

In a third aspect, an embodiment of the disclosure provides a computer device including a processor configured to execute computer program stored in a memory to perform the steps in the method according to any one of the embodiments of the disclosure in the second aspect.

In a fourth aspect, an embodiment of the disclosure provides a computer readable storage medium on which computer instructions are stored, where the instructions are configured to be executed on a computer to cause the computer to perform the method according to any one of the embodiments of the disclosure in the second aspect.

DETAILED DESCRIPTION OF THE EMBODIMENTS

Figure 1:
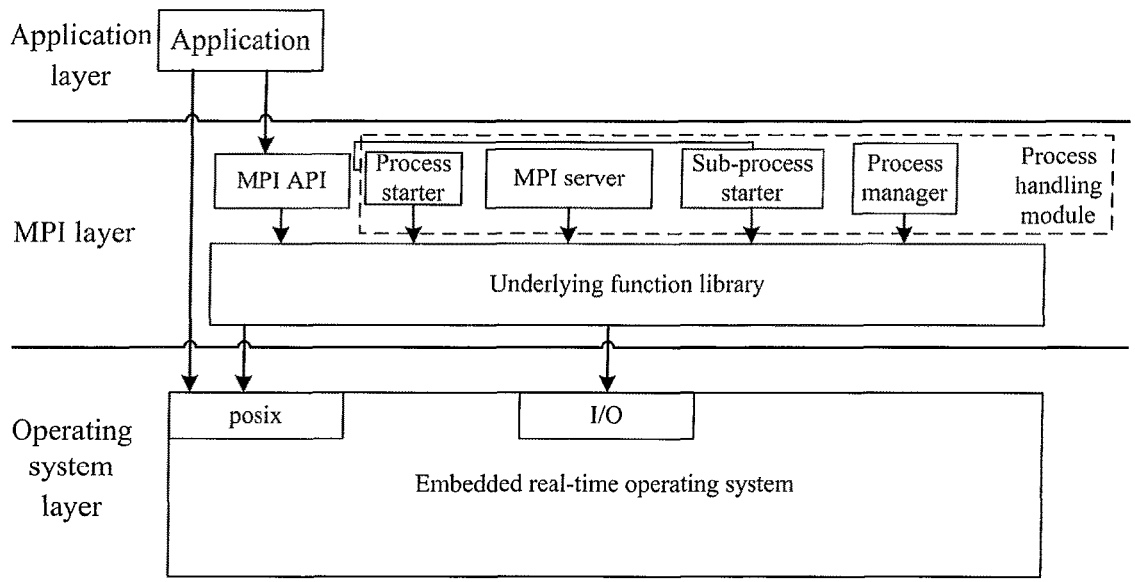
FIG. 1 is a first architectural block diagram of a system for MPI implementation in an embedded operating system according to an embodiment of the disclosure.

In order to address the technical problem above, the technical solutions according to the embodiments of the disclosure are generally as follows; there are a system and method for MPI implementation in an embedded operating system, applicable to a communication system including an application layer, an MPI layer, and an operating system layer, where an MPI application at the application layer is an application allocated to one or more MPI nodes; the MPI layer includes a process handling module, an underlying function library, and an MPI API interface to be invoked by the MPI application; the process handling module is configured to receive a command of a user to invoke the MPI application; and the processing handling module is further configured to start the application in response to the command, and to invoke a service function of the embedded real-time operating system at the operating system layer through the underlying function library to control the one or more MPI node to execute and finish sub-tasks corresponding to the MPI application on the respective nodes. Here the MPI of the embedded real-time operating system is implemented independent of the embedded real-time operating system, but dependent upon a related service provided by the embedded real-time operating system. The MPI of the embedded real-time operating system provides a service interface, i.e., an Application Programming Interface (API), to the higher layer for invoking by the MPI application, and both the name of the API interface, and the description of a related function to be performed are defined in an MPI standard. It is required to provide a corresponding underlying function to the lower layer (the embedded real-time operating system). A network communication function of the MPI is created at the Transmission Control Protocol/ Internet Protocol (TCP/IP) protocol layer provided by the operating system, and performed via a standard socket interface. A process management function is performed dependent upon a task management function provided by the operating system. An Input and Output (IO) function is performed based upon a file system of the operating system, and a standard IO operation interface. Synchronization and mutual-exclusion functions to be performed in MPI components depend upon synchronization and mutual-exclusion mechanisms of the operating system, e.g., a semaphore, a mutual-exclusion lock, an a synchronism signal, etc., so the MPI components are a bridge to connect the MPI application with the operating system for interaction therewith.

Furthermore the MPI relates to parallel programming based upon message passing. The MPI relates to a programming interface standard instead of a particular programming language. In brief, a set of portable programming interfaces is defined in the MPI standard. There are three versions of the MPI standard, i.e., MPI 1.1, MPI 2.0, and MPI 3.0. The embodiments of the disclosure are implemented based upon MPI 3.0, and generally there are the following functions: point-to-point communication, collective communication, parallel IO, remote storage, process management, and MPI standard functional interfaces.

In order to make the technical solutions above better understood, they will be described below in details with reference to the drawings and their particular implementations.

As illustrated in FIG. 1, a first embodiment of the disclosure provides a system for MPI implementation in an embedded operating system, where the system includes an application layer, an MPI layer, and an operating system layer.

Where an MPI application at the application layer is an application allocated to one or more MPI nodes; and the MPI layer includes a process handling module, an underlying function library, and an MPI API interface to be invoked by the MPI application.

The process handling module is configured to receive a command of a user to invoke the MPI application.

The processing handling module is further configured to start the application in response to the command, and to invoke a service function of the embedded real-time operating system at the operating system layer through the underlying function library to control the one or more MPI node to execute and finish sub-tasks corresponding to the MPI application on the respective nodes.

Here the process handling module particularly includes:

A process starter, a server, a sub-process starter, and a process manager operating on each of the one or more MPI nodes.

Figure 2:
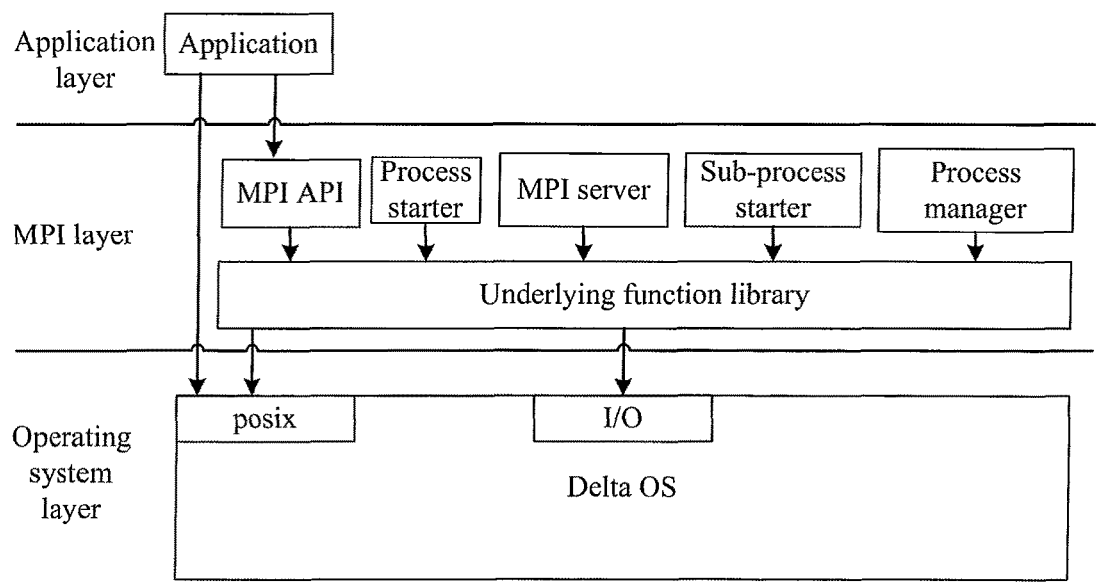
FIG. 2 is a second architectural block diagram of a system for MPI implementation in an embedded operating system according to an embodiment of the disclosure.

Referring to FIG. 2 which is a block diagram of hierarchical layers including the application, the MPI, and the embedded real-time operating system respectively throughout a computing system architecture, the MPI API interface, and the process starter, the server, the sub-process starter, and the process manager in the process handling module, at the MPI layer generally function as follows.

The MPI server (persist_server), which is a resident process, and listens to a service request transmitted by the process starter (mpiexec).

The process starter (mpiexec), which is an initiator of all the MPI applications, and passes operating parameters of a task.

The process manager (hydra_pmi_proxy) is responsible for monitoring and managing tasks of all the MPI application.

The underlying function library (libmpi) is a library upon which particular implementations of all the communication mechanisms, and maintenance of operating states, and all the other applications, in the MPI are dependent.

The MPI API interface provides an interface definition in the MPI 3.0 standard for use by the MPI application.

The sub-process starter (persist_server_slaver) is responsible for calling the process manager, so that the sub-process starter is hidden and exits after the process manager is started normally.

Here the process starter in any one of the one or more MPI nodes is configured to transmit a service connection request to the server of the each MPI node, and to establish a communication connection with the server on the each MPI node, in response to the received command of the user to invoke the MPI application at the application layer. Particularly the process manager in the each MPI node is configured to start the sub-task corresponding to the MPI application on the MPI node, and to invoke the service function of the embedded real-time operating system at the operating system layer through the underlying function library to control the MPI node including the process manager to execute and finish the sub-task corresponding to the MPI application on the MPI node.

The server on the each MPI node is configured to invoke the sub-process starter on the corresponding node in response to the received service connection request.

The sub-process starter on the each MPI node is configured to invoke the process manager on the corresponding node.

Particularly the operating of each MPI application is initiated by the process starter on one of the nodes. After the process starter is launched, it firstly establishes socket communication channels to the MPI servers operating on the respective nodes, then passes operating parameters of the application to the MPI servers, and next switches to a wait state, and after the application is executed on all the nodes, the process starter is stopped from being invoked.

Here the server on the each MPI node is particularly configured:
  after the process starter establishes the communication connection with the server on the each MPI node, to receive parameters of the MPI application transmitted by the process starter, in response to the received service connection request; and
  to invoke the sub-process starter on the MPI node, and to transmit the parameters of the MPI application to the sub-process starter corresponding thereto.

Particularly the MPI server is started automatically along with the embedded real-time operating system being started. The MPI server is programmed to operate on each node to listen to the service connection request initiated by the process starter.

The MPI server receives the connection request of the process starter, loads the sub-process starter, receives the parameters transmitted by the process starter, and next continues with listening to and receiving another connection request.

The sub-process starter is responsible for creating a sub-process to thereby load the process manager, and after the process manager is loaded successfully, the sub-process starter is hidden and exits.

The process manager is a core component of the MPI, and primarily configured to start applications of users, and to manage communication channels between the respective applications, and operating states of the respective applications. After all the applications on the node are executed, the process manager is terminated automatically, and notifies the processor starter of its termination.

The MPI API is an interface layer oriented to development of an MPI application, and complying with the MPI standard, where the interface layer invokes the service function in the underlying function library above the Delta operating system, and the MPI application can be migrated between a number of systems, and a new MPI application can be developed by an application developer based on the an interface provided at the interface layer.

The underlying function library is an MPI underlying function library created by encapsulating the functions of the embedded operating system (e.g., a posix interface, an I/O interface, a socket interface, etc.), and all the other functional modules of the MPI components of the embedded real-time operating system, e.g., the Delta operating system, perform their corresponding service functions based upon the underlying function library.

Furthermore the process manager on the each MPI node is particularly configured to create a process of the sub-task on the MPI node including the process manager, where the process invokes directly the service function of the embedded real-time operating system, or the process invokes the service function in the underlying function library on the embedded real-time operating system via the MPI API interface, to thereby finish the sub-task corresponding to the MPI application on the MPI node.

The process manager receiving the command of the user to invoke the MPI application at the application layer is configured to collect results of executing the sub-tasks on the respective MPI nodes to obtain an operating result of the MPI application.

The process invokes the service function in the underlying function library on the embedded real-time operating system via the MPI API interface as follows:
  the process invokes one or more of the MPI_Send, MPI_Bsend, MPI_Ssend, MPI_Isend, MPI_Ibsend and MPI_Issend interfaces to transmit specific data to a specified process of a specified node for point-to-point communication between the processes; or
  the process invokes one or more of the MPI_Recv and MPI_Irecv interfaces to receive data transmitted from a specified process of a specified MPI node for point-to-point communication between the processes;
  the process invokes the MPI_Win_create interface to access a remote storage function; or
  the process invokes the MPI_Win_lock/MPI_Win_unlock interface to lock and unlock a window being accessed; or
  the process invokes MPI_Put to push data to the server; or
  the process invokes MPI_Get to get data from the server.

Figure 3:
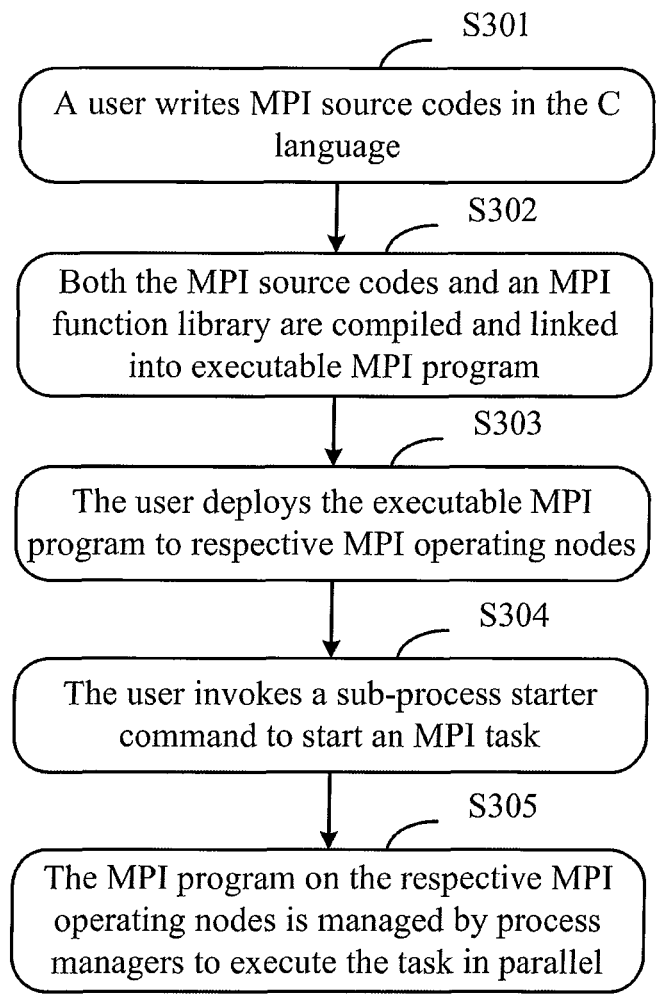
FIG. 3 is a flow chart of developing and operating an MPI application according to an embodiment of the disclosure.

Referring to FIG. 3, there is illustrated a flow chart of developing and operating an MPI application according to an embodiment of the disclosure particularly as follows:
  step S301: a user writes MPI source codes in the C language;
  step S302: both the MPI source codes and an MPI function library are compiled and linked into executable MPI program;
  step S303: the user deploys the executable MPI program to respective MPI operating nodes;
  step S304: the user invokes a sub-process starter command to start an MPI task; and
  step S305: the MPI program on the respective MPI operating nodes is managed by process managers to execute the task in parallel.

In this embodiment, a common flow of developing an MPI application is as follows.

The MPI_Init interface in the MPI API library is invoked to initialize an environment required for operating the MPI application by initializing the states of the MPI components, the states of all the nodes, the states of communication channels between the respective nodes, and various resources to be used in the components.

The MPI_Get_processor_name interface is invoked to get the name of the current MPI application on the MPI node for use in subsequent processing and communication of data.

The MPI_Comm_size interface is invoked to get the total number of processes in a specific communication domain for use in subsequent processing of data.

The MPI_Comm_rank interface is invoked to get a process ID of the current process in the specific communication domain in which there is a unique ID of each process to distinguish the process from the other processes. The ID is allocated and maintained by the MPI components, and can identify a destination to which the data are streamed in data communication.

The data are communicated in the application in a point-to-point mode, and the specific data can be transmitted to the specified process via the MPI_Send/MPI_Bsend/MPI_Ssend/MPI_Isend/MPI_Ibsend/MPI_Issend interface (a number of processes can operate on a node, point-to-point communication generally refers to communication between two processes instead of communication between nodes, and two processes communicating with each other may be located on the same or different nodes); or the data transmitted from the specified process can be received via the MPI_Recv/MPI_Irecv interface, and the type of the data, and the amount of the data are determined by the person who writes the application.

If the data need to be broadcasted in the specific communication domain in the application, then a message may be broadcasted to all the processes in the domain including the process itself via the MPI_Bcast interface.

If the application needs to collect the computing result of the respective processes to a root process, then the computing result of the respective processes in the domain may be returned to the process with the ID of root via the MPI_Reduce interface, and collected together by the process.

If the application needs to access the remote storage function, then the MPI_Win_create interface may be invoked to create a window to be accessed by another process, that is, to reserve a buffer block in the server to be accessed by the other process. The other process can invoke the MPI_Win_lock/MPI_Win_unlock interface to lock and unlock the window being accessed, invoke the MPI_Put interface to push the data to the server, and invoke the MPI_Get interface to get the data from the server.

If the application needs to perform a parallel IO operation, then it may access an IO operation interface available in the MPI library, e.g., MPI_File_open to open a parallel IO file, MPI_File_write_shared to write data into a shared file, MPI_File_get_size to get a file size, MPI_File_read_shared to read data from a shared file, and MPI_File_close to close a shared file.

After the operating of all the applications is finished, they need to invoke the MPI_Finalize interface. The interface is primarily configured to instruct the MPI underlying function library to reclaim resources, and to reset the communication domain, and the initialized states of all the nodes, for use by a subsequent application to be started next time.

The MPI application is complied to create a corresponding executable binary file.

The executable binary file created as a result of the compilation is deployed to the positions corresponding to the respective nodes (the number of nodes is determined as needed in reality, and the binary file of the application shall be located at the same directory position in each node, e.g., the /ahci02:1/mpi directory).

The binary file of each node is started on the root node using the mpiexec.vxe file (the node on which the mpiexec.vxe file is executed is the root node; and the particular position at which the application is placed on each node needs to be passed to mpiexec.vxe as a parameter, and also the number of processes to execute the MPI application on each node needs to be passed to mpiexec.vxe as a parameter).

A result of operating the MPI application is checked for consistency with an expected result.

Figure 4:
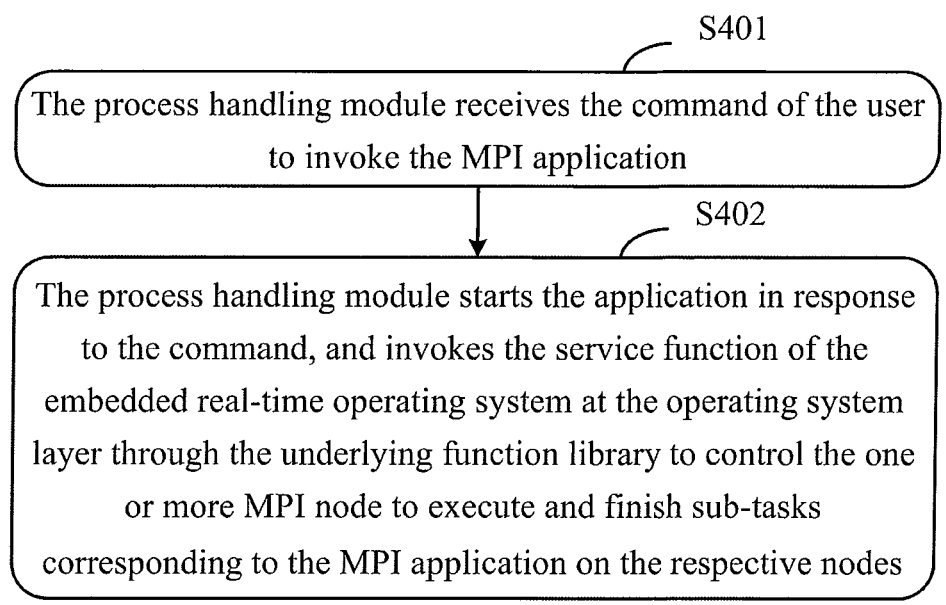
FIG. 4 is a flow chart of a method for MPI implementation in an embedded operating system according to an embodiment of the disclosure.

As illustrated in FIG. 4, a second embodiment of the disclosure provides a method for MPI implementation in an embedded operating system, applicable to a communication system including an application layer, an MPI layer, and an operating system layer, where an MPI application at the application layer is an application allocated to one or more MPI nodes; the MPI layer includes a process handling module, an underlying function library, and an MPI API interface to be invoked by the MPI application; and the method includes the following steps:

step S401: receiving, by the process handling module, a command of a user to invoke the MPI application; and step S402: starting, by the process handling module, the application in response to the command, and invoking a service function of the embedded real-time operating system at the operating system layer through the underlying function library to control the one or more MPI node to execute and finish sub-tasks corresponding to the MPI application on the respective nodes.

Here the process handling module includes: a process starter, a server, a sub-process starter, and a process manager operating on each of the one or more MPI nodes.

Referring to FIG. 2, which is a block diagram of hierarchical layers including the application, the MPI, and the embedded real-time operating system respectively throughout a computing system architecture, the MPI API interface, and the process starter, the server, the sub-process starter, and the process manager in the process handling module, at the MPI layer generally function as follows.

The MPI server (persist_server), which is a resident process, and listens to a service request transmitted by the process starter (mpiexec).

The process starter (mpiexec), which is an initiator of all the MPI applications, and passes operating parameters of a task.

The process manager (hydra_pmi_proxy) is responsible for monitoring and managing tasks of all the MPI application.

The underlying function library (libmpi) is a library upon which particular implementations of all the communication mechanisms, and maintenance of operating states, and all the other applications, in the MPI are dependent.

The MPI API interface provides an interface definition in the MPI 3.0 standard for use by the MPI application.

The sub-process starter (persist_server_slaver) is responsible for calling the process manager, so that the sub-process starter is hidden and exits after the process manager is started normally.

Here the step S402 particularly includes: transmitting, by the process starter in any one of the one or more MPI nodes, a service connection request to the server of the each MPI node, and establishing a communication connection with the server on the each MPI node, in response to the received command of the user to invoke the MPI application at the application layer. Particularly the process manager in the each MPI node is configured to start the sub-task corresponding to the MPI application on the MPI node, and to invoke a service function of the embedded real-time operating system at the operating system layer through the underlying function library to control the MPI node including the process manager to execute and finish the sub-task corresponding to the MPI application on the MPI node.

The server on the each MPI node is configured to invoke the sub-process starter on the corresponding node in response to the received service connection request.

The sub-process starter on the each MPI node is configured to invoke the process manager on the corresponding node.

Particularly the operating of each MPI application is initiated by the process starter on one of the nodes. After the process starter is launched, it firstly establishes socket communication channels to the MPI servers operating on the respective nodes, then passes operating parameters of the application to the MPI servers, and next switches to a wait state, and after the application is executed on all the nodes, the process starter is stopped from being invoked.

The server on the each MPI node invokes the sub-process starter on the corresponding node in response to the received service connection request as follows:

after the process starter establishes the communication connection with the server on the each MPI node, the server on the each MPI node receives parameters of the MPI application transmitted by the process starter, in response to the received service connection request; and the server on the each MPI node invokes the sub-process starter on the MPI node, and transmits the parameters of the MPI application to the sub-process starter corresponding thereto.

Particularly the MPI server is started automatically along with the embedded real-time operating system being started. The MPI server is programmed to operate on each node to listen to the service connection request initiated by the process starter.

The MPI server receives the connection request of the process starter, loads the sub-process starter, receives the parameters transmitted by the process starter, and next continues with listening to and receiving another connection request.

The sub-process starter is responsible for creating a sub-process to thereby load the process manager, and after the process manager is loaded successfully, the sub-process starter is hidden and exits.

The process manager is a core component of the MPI, and primarily configured to start applications of users, and to manage communication channels between the respective applications, and operating states of the respective applications. After all the applications on the node are executed, the process manager is terminated automatically, and notifies the processor starter of its termination.

The MPI API is an interface layer oriented to development of an MPI application, and complying with the MPI standard, where the interface layer invokes the service function in the underlying function library above the Delta operating system, and the MPI application can be migrated between a number of systems, and a new MPI application can be developed by an application developer based on the an interface provided at the interface layer.

The underlying function library is an MPI underlying function library created by encapsulating the functions of the embedded operating system (e.g., a posix interface, an I/O interface, a socket interface, etc.), and all the other functional modules of the MPI components of the embedded real-time operating system, e.g., the Delta operating system, perform their corresponding service functions based upon the underlying function library.

Furthermore the process manager on the each MPI node controls the MPI node including the processing manager to execute and finish the sub-task corresponding to the MPI application on the MPI node as follows: the process manager on the each MPI node creates a process of the sub-task on the MPI node including the process manager, where the process invokes directly the service function of the embedded real-time operating system, or the process invokes the service function in the underlying function library on the embedded real-time operating system via the MPI API interface, to thereby finish the sub-task corresponding to the MPI application on the MPI node.

The process manager receiving the command of the user to invoke the MPI application at the application layer is configured to collect results of executing the sub-tasks on the respective MPI nodes to obtain an operating result of the MPI application.

The process invokes the service function in the underlying function library on the embedded real-time operating system via the MPI API interface as follows:

the process invokes one or more of the MPI_Send, MPI_Bsend, MPI_Ssend, MPI_Isend, MPI_Ibsend and MPI_Issend interfaces to transmit specific data to a specified process of a specified node for point-to-point communication between the processes; or the process invokes one or more of the MPI_Recv and MPI_Irecv interfaces to receive data transmitted from a specified process of a specified MPI node for point-to-point communication between the processes;

the process invokes the MPI_Win_create interface to access a remote storage function; or the process invokes the MPI_Win_lock/MPI_Win_unlock interface to lock and unlock a window being accessed; or the process invokes MPI_Put to push data to the server; or
the process invokes MPI_Get to get data from the server.

In this embodiment, the development and the operating flow of the MPI application, and the common development flow and steps of the MPI application are the same as in the first embodiment, so a repeated description thereof will be omitted here.

A third embodiment of the disclosure provides a computer device including a processor configured to execute computer program stored in a memory to perform the steps of the method according to the first embodiment of the disclosure.

A fourth embodiment of the disclosure provides a computer readable storage medium on which computer instructions are stored, where the instructions are configured to be executed on a computer to cause the computer to perform the method according to any one of the embodiments of the disclosure in the first aspect.

The technical solutions according to the embodiments above of the disclosure have at least the following technical effects or advantages: the embodiments of the disclosure provide a system and method for MPI implementation in an embedded operating system so as to divide a large-scale computing process involving complex computing into a plurality of segments according to a preset algorithm, to distribute one or more of the segments to a plurality of MPI operating nodes (each node may be a standalone computer) via the MPI for separate computing, and to present their computing results collectively via the MPI. The distribution of the segments, and the collection of the computing results can be performed automatically on the MPI without any human intervention. As compared with the prior art, the system and method for MPI implementation in an embedded operating system can lower a hardware requirement on processors of the computers, support multi-thread parallel processing, and improve the operating speed and the extensibility of the application.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A system for Message Passing Interface (MPI) implementation in an embedded operating system, the system for MPI implementation is applicable to a communication system comprising an application layer, an MPI layer, and an operating system layer;
   wherein an MPI application at the application layer is an application allocated to one or more MPI nodes; and the MPI layer comprises a process handling module, an underlying function library, and an MPI Application Programming Interface (API) to be invoked by the MPI application;
   wherein the system for MPI implementation comprises a memory storing instructions and at least one hardware processor, the at least one hardware processor is configured to execute the instructions to control the process handling module to:
   receive a command of a user to invoke the MPI application, to start the application in response to the command, and to invoke a service function of an embedded real-time operating system at the operating system layer through the underlying function library to control the one or more MPI node to execute and finish sub-tasks corresponding to the MPI application on the respective nodes;
   wherein the process handling module comprises: a process starter, a server, a sub-process starter, and a process manager operating on each of the one or more MPI nodes;
   the at least one hardware processor is further configured to execute the instructions to:
   control the process starter in any one of the one or more MPI nodes to transmit a service connection request to the server of the each MPI node, and to establish a communication connection with the server on the each MPI node, in response to the received command of the user to invoke the MPI application at the application layer;
   control the server on the each MPI node to invoke the sub-process starter on the corresponding node in response to the service connection request;
   control the sub-process starter on the each MPI node to invoke the process manager on the corresponding node; and
   control the process manager on the each MPI node to start the sub-task corresponding to the MPI application on the MPI node, and to invoke the service function of the embedded real-time operating system at the operating system layer through the underlying function library to control the MPI node including the process manager to execute and finish the sub-task corresponding to the MPI application on the MPI node.

2. The system for MPI implementation according to claim 1, wherein the at least one hardware processor is further configured to execute the instructions to:
   control the server on the each MPI node to receive parameters of the MPI application transmitted by the process starter, in response to the service connection request, after the process starter is controlled to establish the communication connection with the server on the each MPI node; and
   control the server on the each MPI node to invoke the sub-process starter on the MPI node, and to transmit the parameters of the MPI application to the sub-process starter corresponding thereto.

3. The system for MPI implementation according to claim 2, wherein the at least one hardware processor is further configured to execute the instructions to:
   control the process manager receiving the command of the user to invoke the MPI application at the application layer to collect results of executing the sub-tasks on the respective MPI nodes to obtain an operating result of the MPI application.

4. The system for MPI implementation according to claim 3, wherein the at least one hardware processor is further configured to execute the instructions to:
   control the process manager on the each MPI node to create a process of the sub-task on the MPI node comprising the process manager, the process invokes directly the service function of the embedded real-time operating system, or the process invokes the service function in the underlying function library on the embedded real-time operating system via the MPI API, to thereby finish the sub-task corresponding to the MPI application on the MPI node.

5. The system for MPI implementation according to claim 2, wherein the at least one hardware processor is further configured to execute the instructions to:
   control the process manager on the each MPI node to create a process of the sub-task on the MPI node comprising the process manager, wherein the process invokes directly the service function of the embedded real-time operating system, or the process invokes the service function in the underlying function library on the embedded real-time operating system via the MPI API, to thereby finish the sub-task corresponding to the MPI application on the MPI node.

6. The system for MPI implementation according to claim 1, wherein the at least one hardware processor is further configured to execute the instructions to:
   control the process manager on the each MPI node to create a process of the sub-task on the MPI node comprising the process manager,
   wherein the process invokes directly the service function of the embedded real-time operating system, or the process invokes the service function in the underlying function library on the embedded real-time operating system via the MPI API, to thereby finish the sub-task corresponding to the MPI application on the MPI node.

7. The system for MPI implementation according to claim 6, wherein the process invokes the service function in the underlying function library on the embedded real-time operating system via the MPI API by:
   invoking one or more of MPI_Send, MPI_Bsend, MPI_Ssend, MPI_Isend, MPI_Ibsend and MPI_Issend interfaces to transmit specific data to a specified process of a specified node for point-to-point communication between the processes; or
   invoking one or more of the MPI_Recv and MPI_Irecv interfaces to receive data transmitted from a specified process of a specified MPI node for point-to-point communication between the processes.

8. The system for MPI implementation according to claim 6, wherein the process invokes the service function in the underlying function library on the embedded real-time operating system via the MPI API by:
   invoking the MPI_Win_create interface to access a remote storage function; or invoking the MPI_Win_lock/MPI_Win_unlock interface to lock and unlock a window being accessed; or invoking MPI_Put to push data to the server; or invoking MPI_Get to get data from the server.

9. A method for Message Passing Interface (MPI) implementation in an embedded operating system, applicable to a communication system comprising an application layer, an MPI layer, and an operating system layer, wherein an MPI application at the application layer is an application allocated to one or more MPI nodes; the MPI layer comprises a process handling module, an underlying function library, and an MPI Application Programming Interface (API) to be invoked by the MPI application; and the method comprises:

receiving, by the process handling module, a command of a user to invoke the MPI application;

starting, by the process handling module, the application in response to the command, and invoking a service function of an embedded real-time operating system at the operating system layer through the underlying function library to control the one or more MPI node to execute and finish sub-tasks corresponding to the MPI application on the respective nodes;

wherein the MPI layer further includes a process starter, a server, a sub-process starter, and a process manager operating on each of the one or more MPI nodes; and starting, by the process handling module, the application in response to the command, and invoking the service function of the embedded real-time operating system at the operating system layer through the underlying function library to control the one or more MPI node to execute and finish sub-tasks corresponding to the MPI application on the respective nodes comprises:

transmitting, by the process starter in any one of the one or more MPI nodes, a service connection request to the server of the each MPI node, and establishing a communication connection with the server on the each MPI node, in response to the received command of the user to invoke the MPI application at the application layer;

invoking, by the server on the each MPI node, the sub-process starter on the corresponding node in response to the service connection request;

invoking, by the sub-process starter on the each MPI node, the process manager on the corresponding node; and starting, by the process manager on the each MPI node, the sub-task corresponding to the MPI application on the MPI node, and invoking the service function of the embedded real-time operating system at the operating system layer through the underlying function library to control the MPI node comprising the process manager to execute and finish the sub-task corresponding to the MPI application on the MPI node.

10. The method for MPI implementation according to claim 9, wherein invoking, by the server on the each MPI node, the sub-process starter on the corresponding node in response to the service connection request comprises:

after the process starter establishes the communication connection with the server on the each MPI node, receiving, by the server on the each MPI node, parameters of the MPI application transmitted by the process starter, in response to the received service connection request; and invoking, by the server on the each MPI node, the sub-process starter on the MPI node, and transmitting the parameters of the MPI application to the sub-process starter corresponding thereto.

11. The method for MPI implementation according to claim 9, wherein:

the process manager receiving the command of the user to invoke the MPI application at the application layer is configured to collect results of executing the sub-tasks on the respective MPI nodes into an operating result of the MPI application.

12. The method for MPI implementation according to claim 11, wherein controlling, by the process manager on the each MPI node, the MPI node comprising the process manager to execute and finish the sub-task corresponding to the MPI application on the MPI node comprises:

creating, by the process manager on the each MPI node, a process of the sub-task on the MPI node comprising the process manager, wherein the process invokes directly the service function of the embedded real-time operating system, or the process invokes the service function in the underlying function library on the embedded real-time operating system via the MPI API, to thereby finish the sub-task corresponding to the MPI application on the MPI node.

13. The method for MPI implementation according to claim 12, wherein invoking, by the process, the service function in the underlying function library on the embedded real-time operating system via the MPI API, comprises:

invoking, by the process, one or more of MPI_Send, MPI_Bsend, MPI_Ssend, MPI_Isend, MPI_Ibsend and MPI_Issend interfaces to transmit specific data to a specified process of a specified node for point-to-point communication between the processes; or invoking, by the process, one or more of the MPI_Recv and MPI_Irecv interfaces to receive data transmitted from a specified process of a specified MPI node for point-to-point communication between the processes.

14. The method for MPI implementation according to claim 12, wherein invoking, by the process, the service function in the underlying function library on the embedded real-time operating system via the MPI API comprises:

invoking the MPI_Win_create interface to access a remote storage function; or invoking the MPI_Win_lock/MPI_Win_unlock interface to lock and unlock a window being accessed; or invoking MPI_Put to push data to the server; or invoking MPI_Get to get data from the server.

* * * * *